Patented Aug. 15, 1950

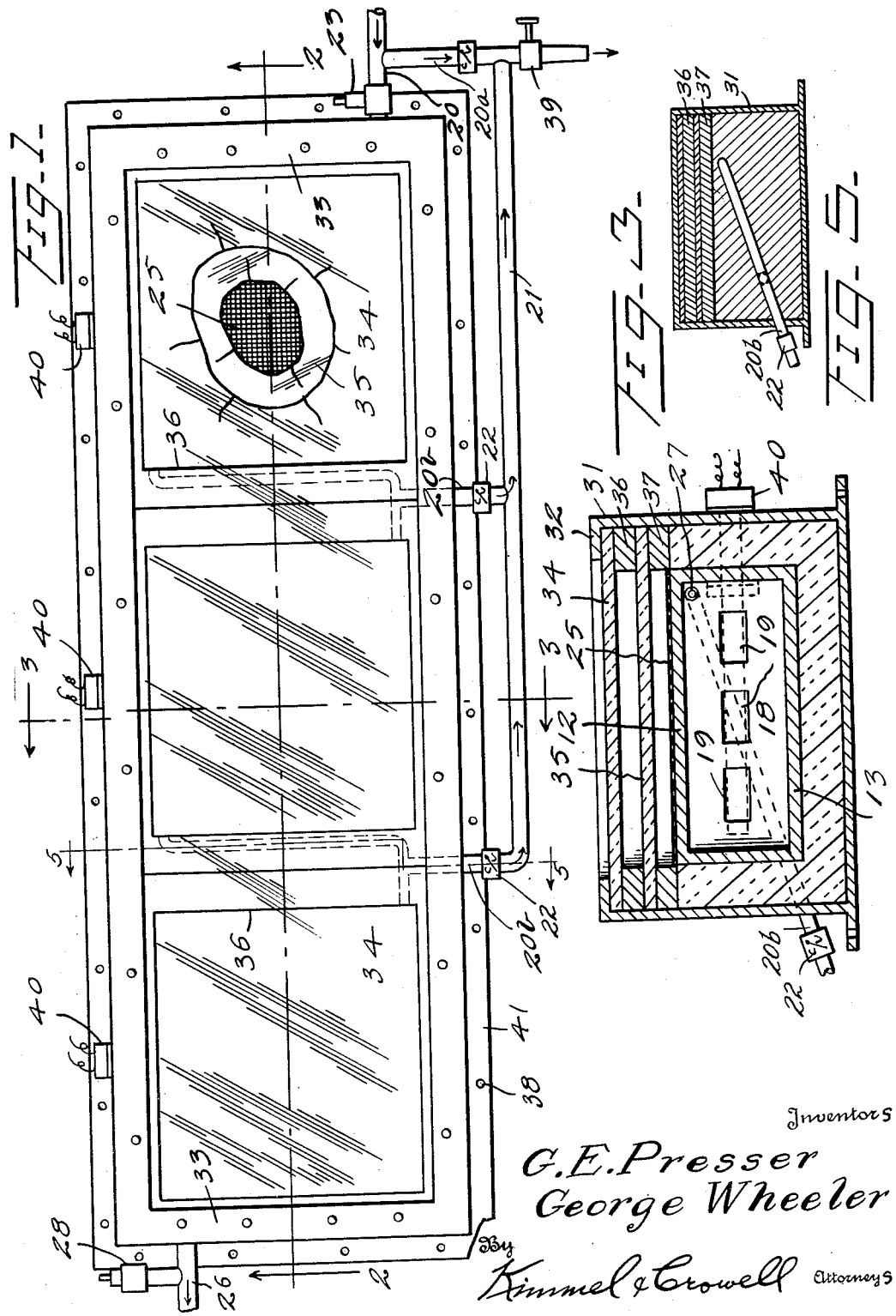

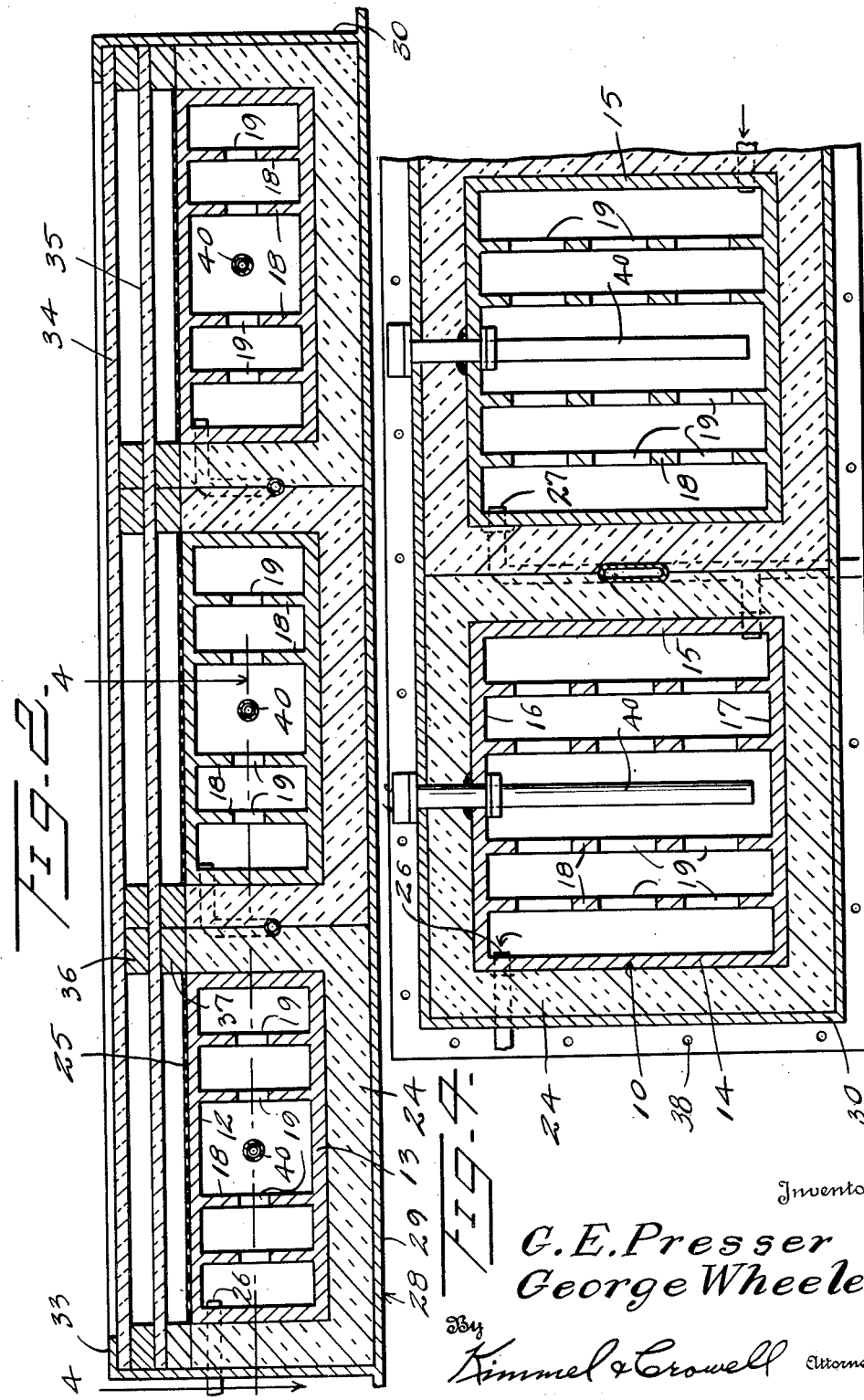

2,519,281

UNITED STATES PATENT OFFICE 2,519,281

WATER HEATER AND STORAGE UNIT

Glenn E. Presser and George Wheeler, Miami, Fla.

Application November 14, 1946, Serial No. 709,820

1 Claim. (Cl. 126—271)

This invention relates to solar heaters.

An object of this invention is to provide a solar water heater and storage reservoir which includes single units or a series of coupled units which are imbedded in heat insulation with one side thereof exposed to the sun rays through glass.

Another object of this invention is to provide a solar water heater and storage reservoir constructed in one unit, including a booster heating means so that the water may be heated to the desired degree above the temperature of the water obtained from the sun rays.

Another object of this invention is to provide a solar heater which may be used with a pressure water system and when they are installed in more than single units include check valves for establishing the flow of water from each solar heater and storage reservoir unit to a drain valve.

A further object of this invention is to provide a heater of this kind wherein the heating and storage units may be cast out of metal, or formed of welded parts.

With the above and other objects in view, our invention consists in the arrangement, combination and details of construction disclosed in the drawings and specification, and then more particularly pointed out in the appended claim.

In the drawings,

Figure 1 is a plan view, partly broken away, of a solar heater constructed according to an embodiment of this invention, Figure 2 is a sectional view taken on line 2—2 of Figure 1, Figure 3 is a sectional view taken on the line 3—3 of Figure 1, Figure 4 is a fragmentary sectional view taken on the line 4—4 of Figure 2, Figure 5 is a sectional view taken substantially along the line 5—5 of Figure 1.

Referring to the drawings, the numeral 10 designates generally one unit of a series of connected solar heaters which are constructed according to an embodiment of this invention. These heaters have been shown in the drawings mounted in a single casing, but it will be understood that any desired number of these heaters may be mounted as a single water heating and storage means.

The heating unit 10 comprises upper and lower walls 12 and 13 respectively, which are connected together at their opposite ends by end walls 14 and 15. Upstanding side walls 16 and 17 are secured to the opposite lengthwise edges of the walls 12 and 13 and the side and end walls constitute a means for providing a closed housing through which water is adapted to pass.

The heating unit 10 is adapted to be braced to withstand inside pressure by means of a plurality of bracing plates 18 which are fixed between and secured to upper and lower walls 12 and 13 respectively, and are secured to and between the side walls 16 and 17. The bracing members 18 are formed with elongated holes 19 therethrough, whereby the water may freely pass through these bracing members from the inlet to the outlet of the heater and storage unit.

An intake pipe 20 is secured to the end wall 15 and the pipe 20b is connected to a common drain pipe 21 extending lengthwise of the multiple assembly. A check valve 22 is interposed in the pipe 20b so as to provide for movement of the water in only one direction, that is, toward the drain cock. The endmost heating member 10 has connected thereto an intake pipe 20a which is also connected to the drain pipe 21 by pipe 20b and a pressure relief valve 23 is interposed in the intake pipe 20.

The heating element and storage unit 10 is adapted to be imbedded in a heat insulating medium 24 which engages the bottom, the opposite sides and the opposite ends of the unit, leaving the top wall thereof free for exposure to the run rays through glass. The top wall 12, on the upper surface thereof, is coated black, as indicated at 25, so that the run rays will be absorbed by the top wall 12.

The heating and storage unit 10 in single unit installations also has connected thereto an outlet pipe 26 which extends through the insulating means 24 and the outlet pipe 26 is connected to a hot water pipe distributing system. A pressure relief valve 28 is interposed in pipe 26 so as to provide for safety from over heating.

The heating and storage member 10, when installed in more than single units, has a cold water supply pipe 20 connected to lower end of wall 15, through which cold water enters the first unit 10. In top end of wall 14, an outlet pipe is provided. Through this pipe 27 hot water passes to the next unit inlet in the lower end of wall 15, which is repeated with each succeeding unit in the installation. From the last unit 10 hot water leaves heater and storage units through pipe 26. The water moves from the heater and storage units as same is used at the hot water faucets or hot water appliances.

The heat insulation 24 has disposed thereabout an outer casing or jacket 28 which includes a bottom wall 29, end walls 30, and opposite side walls 31. An inwardly extending flange 32 extends from the side walls 31 and a similar inwardly extending flange 33 extends from the end walls 30. A pair of transparent panels 34 and 35 are disposed above the top wall 12, being supported in spaced relation with respect to each other by spacer members 36, and supported in spaced relation to the top wall 12 by spacer members 37. The top flanges 32 and 33 engage over the uppermost transparent panels 34 so as to hold these panels in proper position.

The flanges 32 and 33 may, if desired, be made removable, in a conventional manner, so that the panels 34 and 35 may be replaced when broken or when first mounted in the unit. Base flanges 41 carried by the jacket are formed with openings 38 so that securing bolts may be passed through the flanges in order to attach the device on a suitable support. A drain valve 39 is connected to the pipe 21 for draining water from this pipe, and the valve 39 may be connected to a suitable drain means.

In order to provide a means whereby the temperature of the water heated in one or all heating and storage units may be boosted, we have provided an elongated electrical heating unit 40 which projects through the side wall 16 and is adapted to be connected to a suitable source of electric current supply. The electrical booster heating element may also be used for heating the water in each heating and storage unit at a time when the sun rays do not strike the device. At other times, the booster heater 40 may be used for raising the temperature of the water above the point to which the water is heated by the sun rays.

In the use and operation of this heater, the pipe 21 is connected to a source of water supply and the pipe 27 is connected to the hot water connections in the house. The unit is placed in a position where it will receive the sun rays, these rays passing through the transparent panels and striking the black surface 25 of the heating element. The water as it becomes heated circulates through the openings 19 of the bracing members 18 and remains stored in the unit until drawn through the outlet connections 26. In the event it is desired to raise the temperature of the water above that obtained from the sun rays, the electric booster members 40 are energized. These booster members 40 are of conventional construction.

We do not mean to confine ourselves to the exact details of construction herein disclosed, but claim all variations falling within the purview of the appended claim.

What we claim is:

A solar heater and storage unit comprising a plurality of aligned heater and storage members, each formed of top and bottom walls, opposite side and end walls, heat insulating means about the bottom, sides and ends of said members, a pair of spaced glass panels disposed over the tops of said members, spaced vertically disposed bracing plates extending between said top and bottom and said side walls, each plate being formed with horizontally elongated openings between the upper and lower edges thereof, inclined water circulating pipes connected between adjacent ones of said members, the inlet end of said circulating pipes being connected adjacent the top of an associated member and the outlet thereof being connected adjacent the bottom of the next member, a drain pipe connected to each of said water circulating pipes, outwardly opening check valves interposed in said drain pipes, a water outlet pipe connected to one of said members, and a water inlet pipe connected to another of said members.

GLENN E. PRESSER.
GEORGE WHEELER.

REFERENCES CITED

The following references are of record in the file of this patent:

UNITED STATES PATENTS

| Number | Name | Date |
|---|---|---|
| 629,122 | Davis | July 18, 1899 |
| 659,450 | McHenry | Oct. 9, 1900 |
| 682,658 | Wishart | Sept. 17, 1901 |
| 695,136 | Baker | Mar. 11, 1902 |
| 807,642 | Sides et al. | Dec. 19, 1905 |
| 1,130,871 | Willsie | Mar. 9, 1915 |
| 1,162,505 | Nichols | Nov. 30, 1915 |
| 1,250,260 | Wilcox | Dec. 18, 1917 |
| 1,889,238 | Clark | Nov. 29, 1932 |
| 1,971,242 | Wheeler | Aug. 21, 1934 |
| 2,122,821 | Mohr | July 5, 1938 |
| 2,154,216 | Savage | Apr. 11, 1939 |
| 2,274,492 | Modine | Feb. 24, 1942 |

FOREIGN PATENTS

| Number | Country | Date |
|---|---|---|
| 724,819 | France | Jan. 30, 1932 |
| 828,212 | France | Feb. 7, 1938 |
| 835,819 | France | Sept. 19, 1938 |